United States Patent
Suzuki

(10) Patent No.: US 7,372,064 B2
(45) Date of Patent: May 13, 2008

(54) RADIATION IMAGE STORAGE PANEL

(75) Inventor: Hideki Suzuki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 49 days.

(21) Appl. No.: 10/922,903

(22) Filed: Aug. 23, 2004

(65) Prior Publication Data

US 2005/0040351 A1    Feb. 24, 2005

(30) Foreign Application Priority Data

Aug. 22, 2003   (JP)   ............... 2003-299161

(51) Int. Cl.
   *G03B 42/08*   (2006.01)
(52) U.S. Cl. .................................... 250/581
(58) Field of Classification Search ............... 250/580, 250/581

See application file for complete search history.

(56) References Cited

U.S. PATENT DOCUMENTS

| | | | | |
|---|---|---|---|---|
| 4,944,026 | A | * | 7/1990 | Arakawa et al. ......... 250/484.4 |
| 5,925,473 | A | * | 7/1999 | Kuriyama et al. .......... 428/690 |
| 6,246,063 | B1 | * | 6/2001 | Fukui ..................... 250/484.4 |
| 6,376,844 | B1 | * | 4/2002 | Tasaki et al. ............ 250/484.4 |
| 6,452,192 | B1 | | 9/2002 | Kohda |
| 6,815,092 | B2 | * | 11/2004 | Van den Bergh et al. ... 428/690 |
| 2005/0199826 | A1 | * | 9/2005 | Saito et al. .............. 250/484.4 |
| 2006/0065852 | A1 | * | 3/2006 | Fukui et al. ............. 250/484.4 |

* cited by examiner

*Primary Examiner*—Constantine Hannaher
(74) *Attorney, Agent, or Firm*—Sughrue Mion, PLLC

(57) ABSTRACT

A radiation image storage panel is composed of a phosphor layer containing an energy-storing phosphor and a light-reflecting layer contains particles of light-reflecting material, a binder, and a surface-treatment agent.

4 Claims, 1 Drawing Sheet

Figure
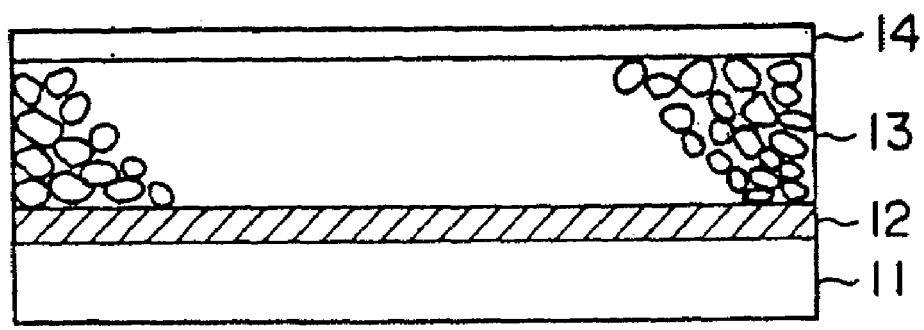

RADIATION IMAGE STORAGE PANEL

FIELD OF THE INVENTION

The present invention relates to a radiation image storage panel employable in a radiation image recording and reproducing method in which an energy-storing phosphor is utilized.

BACKGROUND OF THE INVENTION

When exposed to radiation such as X-rays, an energy-storing phosphor (e.g., stimulable phosphor, which gives stimulated emission off) absorbs and stores a portion of the radiation energy. The phosphor then emits stimulated emission according to the level of the stored energy when it is exposed to electromagnetic wave such as visible or infrared light (i.e., stimulating light). A radiation image recording and reproducing method utilizing the energy-storing phosphor has been widely employed in practice. In that method, a radiation image storage panel, which is a sheet comprising the energy-storing phosphor, is used. The method comprises the steps of: exposing the storage panel to radiation having passed through an object or having radiated from an object, so that radiation image information of the object is temporarily recorded in the panel; sequentially scanning the storage panel with a stimulating light such as a laser beam to emit stimulated light; and photoelectrically detecting the emitted light to obtain electric image signals. The storage panel thus treated is subjected to a step for erasing radiation energy remaining therein, and then stored for the use in the next recording and reproducing procedure. Thus, the radiation image storage panel can be repeatedly used.

The radiation image storage panel (often referred to as energy-storing phosphor sheet) has a basic structure comprising a support and an energy-storing phosphor layer provided thereon. However, if the phosphor layer is self-supporting, the support may be omitted. Further, a protective layer is normally provided on the free surface (surface not facing the support) of the phosphor layer to keep the phosphor layer from chemical deterioration or physical damage.

The phosphor layer generally comprises a binder and an energy-storing phosphor dispersed therein. However, the phosphor layer may comprise agglomerate of an energy-storing phosphor without binder, and in fact that phosphor layer is already known. The phosphor layer containing no binder can be formed by a vapor phase deposition method or by a firing method. Further, the phosphor layer may comprise energy-storing phosphor agglomerate impregnated with a polymer material, which is already known, too.

Japanese Patent Provisional Publication 2001-255610 discloses a variation of the radiation image recording and reproducing method. While an energy-storing phosphor of the storage panel used in the ordinary method plays both roles of radiation-absorbing function and energy-storing function, those two functions are separated in the disclosed method. In the method, a radiation image storage panel comprising an energy-storing phosphor (which stores radiation energy) is used in combination with a phosphor screen comprising another phosphor which absorbs radiation and emits ultraviolet or visible light. The disclosed method comprises the steps of causing the radiation-absorbing phosphor of the screen (and of the panel) to absorb and convert radiation having passed through an object or having radiated from an object into ultraviolet or visible light; causing the energy-storing phosphor of the panel to store the energy of the converted light as radiation image information; sequentially exciting the energy-storing phosphor with a stimulating light to emit stimulated light; and photoelectrically detecting the emitted light to obtain electric signals giving a visible radiation image.

The radiation image recording and reproducing method (or radiation image forming method) has various advantages as described above. However, it is still desired that the radiation image storage panel used in the method have a sensitivity as high as possible and, at the same time, give a reproduced radiation image of high quality (in regard to sharpness and graininess).

For improving the sensitivity of radiation image storage panel, a light-reflecting layer is often provided between the support and the phosphor layer. Japanese Patent Provisional Publication 2001-124898 discloses a radiation image storage panel in which a light-reflecting layer is provided on one side of the phosphor layer containing a stimulable phosphor. The light-reflecting layer contains light-reflecting material, and shows a scattering length of 5 μm or less at the wavelength where a stimulating light excites the stimulable phosphor. By providing a light-reflecting layer showing such a short scattering length, the storage panel is improved not only in the sensitivity but also in the sharpness. That is because the stimulating light is reflected with enough reflectivity to prevent from diffusing, and accordingly the storage panel gives a reproduced radiation image of high quality with high sensitivity.

In order to prepare a light-reflecting layer giving the above-described short scattering length, it is necessary to pack densely the light-reflecting material in the form of fine particles (i.e., it is necessary to lower the ratio of binder/reflecting material in the light-reflecting layer) in the reflecting layer. However, if a coating solution for the reflecting layer contains a relatively large amount of the reflecting material, a coating solution suffers from various troubles. For example, the particles of reflecting material are prone to be insufficiently dispersed; the resultant reflecting layer is apt to have uneven thickness; and defects (e.g., lines or spots due to unevenly spread coating solution) are often formed in the coated layer. The insufficient dispersion lowers reflectivity of the reflecting layer, uneven layer thickness disadvantageously makes image-signals with such uneven S/N ratios that the resultant storage panel has uneven sensitivity, and the troubles occurring in the coating procedure increase the production cost.

SUMMARY OF THE INVENTION

It is an object of the present invention to provide a radiation image storage panel giving a radiation image of high quality with high sensitivity.

The applicant has studied the above-mentioned problems concerning the light-reflecting layer, and finally found that the light-reflecting material can be more evenly dispersed and the coating solution can be made highly fluid by incorporating a surface-treatment agent.

The present invention resides in a radiation image storage panel which comprises a phosphor layer containing an energy-storing phosphor and a light-reflecting layer provided on one side thereof, wherein the light-reflecting layer comprises, at least, particles of light-reflecting material, a binder, and a surface-treatment agent.

The invention also resides in a radiation image storage panel which comprises a support, a light-reflecting layer, a phosphor layer containing an energy-storing phosphor, and a transparent protective layer, wherein the light-reflecting layer comprises, at least, particles of light-reflecting material, a binder, and a surface-treatment agent.

The radiation image storage panel of the invention, which comprises a light-reflecting layer containing a surface-treatment agent, has high sensitivity because the light-reflecting material is well dispersed in the light-reflecting layer to give high reflectivity. Further, the thickness of the light-reflecting layer can be made so even that the S/N ratio is constant over the phosphor layer enough to obtain almost same sensitivity. Furthermore, troubles in the coating procedure can be avoided. Accordingly, the radiation image storage panel of the invention shows high sensitivity and gives a radiation image of high quality.

BRIEF DESCRIPTION OF DRAWING

FIGURE is a sectional view schematically illustrating an example of the structure of radiation image storage panel according to the invention.

DETAILED DESCRIPTION OF THE INVENTION

Preferred embodiments of the radiation image storage panel according to the invention are as follows.

(1) The surface-treatment agent is at least one coupling agent selected from the group consisting of an aluminum coupling agent, a titanate coupling agent and a silane coupling agent. Particularly preferred is an aluminum coupling agent.

(2) The light-reflecting layer gives a scattering length of 5 μm or less to a stimulating light which excites the energy-storing phosphor.

(3) The light-reflecting material is a white pigment, and is preferably at least one white pigment selected from the group consisting of alumina, yttrium oxide, zirconium oxide and titanium dioxide.

(4) The particles of light-reflecting material have a mean particle size in the range of 0.1 to 2.0 μm.

(5) The weight ratio of the binder to the light-reflecting material is in the range of 1/10 to 1/50.

(6) The amount of the surface-treatment agent in the light-reflecting layer is in the range of 0.05 to 5 wt. % based on the amount of the light-reflecting material.

(7) The phosphor layer containing an energy-storing phosphor is prepared from a coating solution comprising the energy-storing phosphor and a binder.

(8) The phosphor layer containing an energy-storing phosphor is prepared by a gas-phase accumulation method in which the energy-storing phosphor or its starting material is deposited on a substrate in a vacuum container.

In the following description, the radiation image storage panel of the invention is explained in detail.

The support normally is a soft resin sheet or film having a thickness of 50 μm to 1 mm. The support may be transparent, may contain light-reflecting material (e.g., particles of alumina, titanium dioxide and barium sulfate) or voids for reflecting the stimulating light or the emission, or may contain light-absorbing material (carbon black) for absorbing the stimulating light or the emission. Examples of the resin materials employable for the support include polyethylene terephthalate, polyethylene naphthalate, aramide resin and polyimide resin. For improving the sharpness of the resultant image, fine concaves and convexes may be formed on the phosphor layer-side surface of the support (or on the phosphor layer-side surface of an auxiliary layer such as a subbing layer, a light-reflecting layer, or a light-absorbing layer, if it is provided). The support may be a sheet of metal, ceramics, or glass, if desired.

It is preferred to provide an adhesive layer to enhance the adhesion between the support and the light-reflecting layer. Examples of resin employable for forming the adhesive layer include polyester resin, acryl resin, polyurethane resin, polyvinyl butyral, polyvinyl acetate, vinylidene chloride-vinyl chloride copolymer. These resins may be used singly or in combination. Preferably, the resin is hardened with a hardening agent such as isocyanate or melamine resin. The hardening agent can be used in an amount of generally 1 to 50 wt. %, preferably 5 to 30 wt. %, based on the amount of the resin The adhesive layer can be formed by the steps of: preparing a coating solution in which an adhesive resin and optionally a hardening agent are dissolved or dispersed in an appropriate organic solvent, evenly coating a surface of the support with the coating solution, and drying the solution coated on the surface. The organic solvent can be optionally selected from the solvents described later for preparing the coating solution from which the phosphor layer is formed. To the coating solution for forming the adhesive layer, an electroconductive material may be added. The adhesive layer has a thickness in the range of generally 1 to 50 μm, preferably 3 to 30 μm.

In preparing the light-reflecting layer on the adhesive layer, a portion (generally, 1 to 50 vol. % of the adhesive layer may be dissolved once by the solvent of the coating solution for the light-reflecting layer, so that the adhesive layer can be bonded strongly to the light-reflecting layer. If so, the adhesion between the support and the reflecting layer is so increased that the light-reflecting layer can be strongly fixed onto the support and accordingly that the resultant panel can have excellent durability even though the light-reflecting layer contains a large amount of a light-reflecting material. Further, if the adhesive layer is hardened with a hardening agent, the adhesive resin in the adhesive layer is not dissolved in forming the light-reflecting layer and hence is prevented from contaminating the light-reflecting layer, and the adhesion onto the support can be kept high.

Onto the support (or on the adhesive layer), the light-reflecting layer is provided. The light-reflecting layer of the present invention comprises particles of light-reflecting material, a binder dispersing and supporting the particles, and a surface-treatment agent.

The light-reflecting layer scatters a stimulating light under such condition that the scattering length can be preferably 5 μm or less, more preferably 4 μm or less. The "scattering length" means an average distance in which a stimulating light travels until it is scattered, and hence a short scattering length indicates that the stimulating light is highly scattered. The scattering length can be calculated based on Kubeluka-Munk theory in the manner described, for example, in Japanese Patent Provisional Publication 2001-124898.

Examples of the light-reflecting materials include white pigments such as $Al_2O_3$, $ZrO_2$, $TiO_2$, $MgO$, $BaSO_4$, $SiO_2$, $ZnS$, $ZnO$, $CaCO_3$, $Sb_2O_3$, $Nb_2O_5$, $2PbCO_3.Pb(OH)_2$, $PbF_2$, $BiF_3$, $Y_2O_3$, $YOCl$, $M^{II}FX$ (in which $M^{II}$ is at least one selected from the group consisting of Ba, Sr and Ca; and X is at least one selected from the group consisting of Cl and Br), lithopone ($BaSO_4$ and $ZnS$), magnesium silicate, basic lead silicate sulfate, basic lead phosphate, and aluminum silicate; and hollow polymer. They may be used singly or in combination. Particularly preferred are $Al_2O_3$, $Y_2O_3$, $ZrO_2$ and $TiO_2$, which have such a high refractive index that the scattering length of the reflecting layer can be easily made 5 μm or shorter.

In order to prepare the light-reflecting layer giving the short scattering length, the particles of light-reflecting material may be made to have a diameter as close as possible to the wavelength of the stimulating light and/or made to have not a spherical shape but a deformed one. In detail, the mean size of the particles is preferably ¼ to 2 times as large as the stimulating wavelength. In other words, the mean size of the particles preferably is in the range of 0.1 to 2.0 μm because the stimulating light is generally in the wavelength range of 5.00 to 800 nm.

The BET specific surface area (surface area per unit mass) of the light-reflecting material generally is 1.5 m²/g or more, preferably in the range of 2 to 10 m²/g, more preferably in the range of 2.5 to 8 m²/g. The bulk density (closest packing density) of the reflecting material preferably is 1 mg/cm³ or less, more preferably 0.6 mg/cm³ or less. The bulk density (closest packing density) can be determined by the steps of weighing a powder of the light-reflecting material, shaking the powder to fill voids therein so that the powder may be packed closest, measuring the volume of the closest packed powder, and calculating a ratio of the weight to the volume.

The light-reflecting material in the form of fine particles having the above characters is incorporated into the light-reflecting layer, and thereby many voids are formed in the reflecting layer. Because of thus-formed voids, the reflecting layer can have such a high refractive index that a short scattering length can be given without aggregating the particles.

As the surface-treatment agents, various known surface-treatment agents can be used. Preferred are an aluminum coupling agent, a titanate coupling agent and a silane coupling agent. Particularly preferred is an aluminum coupling agent. Examples of the aluminum coupling agent include alkylacetoacetatealumium diisopropylate (Plane-act Al-M, available from Ajinomoto Inc.). Examples of the titanate coupling agents include Plane-act KR TTS, KR 46B, KR 55, KR 41B, KR 38S, KR 138S, KR 238S, 338X, KR 44, KR 9SA, and KR ET (trade names, available from Ajinomoto Inc.).

Examples of the silane coupling agent include vinyltrichlorosilane (KA-1003 [trade name], available from Shin-Etsu Chemical Co., Ltd.), vinyltrimethoxysilane (KBM-1003), vinyltriethoxysilane (KBE-1003), 2-(3,4-epoxycyclohexyl)-ethyltrimethoxysilane (KBM-303), 3-glycidoxypropyltri-methoxysilane (KBM-403), 3-glycidoxy-propylmethyldi-ethoxysilane (KBE-402), 3-glycidoxypropyl-triethoxysilane (KBE-403), p-styryltrimethoxysilane (KBM-1403), 3-methacryloxypropylmethyldimethoxysilane (KBM-502), 3-methacryloxypropyltrimethylsilane (KBM-503), 3-methacryloxypropylmethyldiethoxysilane (KBE-502), 3-methacryloxypropyltriethylsilane (KBE-503), 3-acryloxy-propyltrimethylsilane (KBM-5103), N-2-(amino-ethyl)-3-aminopropylmethyldimethoxysilane (KBM-602), N-2-(amino-ethyl)-3-aminopropyltrimethoxysilane (KBM-603), N-2-(aminoethyl)-3-aminopropyltriethoxysilane (KBE-603), 3-aminopropyltrimethoxysilane (KBM-903), 3-aminopropyltriethoxysilane (KBE-903), 3-triethoxysilyl-N-(1, 3-dimethyl-butylidene)propylamine (KBE-9103), N-phenyl-3-aminopropyltrimethoxysilane (KBM-573), hydrochloric salt of N-(vinylbenzyl)-2-aminoethyl-3-aminopropyltrimethoxysilane (KBM-575), special aminosilane (KBM-6123), 3-ureido-propyltriethoxysilane (KBE-585); 3-chloropropyltri-methoxy-silane (KBM-703), 3-mercaptopropylmethyldi-methoxysilane (KBM-802), 3-mercaptopropyltrimethoxysilane (KBM-803), bis(triethoxysilylpropyl) tetrasulfide (KBE-846), and 3-isocyanatepropyltriethoxysilane (KBE-9007).

The light-reflecting layer can be formed by the steps of preparing a coating solution in which fine particles of light-reflecting material, a binder and the surface-treatment agent are dissolved or dispersed in an organic solvent, evenly coating the surface of the support (or the adhesive layer) with the coating solution, and drying the coated solution. The weight ratio of the binder to the light-reflecting material in the coating solution is generally in the range of 1/10 to 1/50, preferably in the range of 1/10 to 1/20. The amount of the surface-treatment agent is generally in the range of 0.05 to 5 wt. %, preferably in the range of 0.1 to 2 wt. %, based on the amount of the light-reflecting material. The binder and the organic solvent can be optionally selected from those described later for preparing the coating solution from which the phosphor layer is formed. The coating procedure can be carried out by an ordinary means such as a doctor blade, a roll coater or a knife coater. The thickness of the light-reflecting layer is generally in the range of 5 to 300 μm.

The light-reflecting material in the form of fine particles can be evenly dispersed in the coating solution in the presence of a surface-treatment agent. At the same time, the surface-treatment agent also makes the coating solution highly fluid to spread evenly so that the coating defects can be avoided.

On the light-reflecting layer, a phosphor layer comprising energy-storing phosphor is provided. In consideration of the image quality, the phosphor layer preferably scatters the stimulating light and the stimulated emission so that the scattering length can be adjusted in the range of 5 to 20 μm.

The energy-storing phosphor preferably is a stimulable phosphor giving stimulated emission off in the wave-length region of 300 to 500 nm when it is exposed to a stimulating light in the wavelength region of 400 to 900 nm. Preferred examples of the stimulable phosphors include europium or cerium activated alkaline earth metal halide stimulable phosphors [e.g., BaFBr:Eu and BaF(Br, I):Eu] and cerium activated rare earth oxyhalide phosphors.

Particularly preferred is a rare earth activated alkaline earth metal fluoride halide stimulable phosphor represented by the formula (I):

$$M^{II}FX:zLn \quad (I)$$

in which $M^{II}$ is at least one alkaline earth metal selected from the group consisting of Ba, Sr and Ca; Ln is at least one rare earth element selected from the group consisting of Ce, Pr, Sm, Eu, Tb, Dy, Ho, Nd, Er, Tm and Yb; X is at least one halogen selected from the group consisting of Cl, Br and I; and z is a number satisfying the condition of $0<z\leq 0.2$.

In the formula (I), $M^{II}$ preferably comprises Ba more than half of the total amount of $M^{II}$, and Ln is preferably Eu or Ce. The $M^{II}$FX in the formula (I) represents a matrix crystal structure of BaFX type, and it by no means indicates stoichiometrical composition of the phosphor. Accordingly, a molar ratio of F:X is not always 1:1. It is generally preferred that the BaFX type crystal have many $F^+(X^-)$ centers corresponding to vacant lattice points of $X^-$ ions since they increase the efficiency of stimulated emission in the wavelength region of 600 to 700 nm. In that case, F is often slightly in excess of X.

Although omitted from the formula (I), one or more additives such as bA, $wN^I$, $xN^{II}$ and $yN^{III}$ may be incorporated into the phosphor of the formula (I), if needed. In the above, A stands for a metal oxide such as $Al_2O_3$, $SiO_2$ or $ZrO_2$. In order to prevent $M^{II}$FX particles from sintering, the metal oxide preferably has low reactivity with $M^{II}$FX and the primary particles of the oxide are preferably super-fine particles of 0.1 μm or less diameter. In the above-mentioned description, $N^I$ is a compound of at least one alkali metal selected from the group consisting of Li, Na, K, Rb and Cs; $N^{II}$ is a compound of alkaline earth metal(s) Mg and/or Be; and $N^{III}$ is a compound of at least one trivalent metal selected from the group consisting of Al, Ga, In, Tl, Sc, Y, La, Gd and Lu. The metal compounds are preferably halides.

In the above-mentioned description, b, w, x and y represent amounts of the additives incorporated into the starting materials, provided that the amount of $M^{II}FX$ is assumed to be 1 mol. They are numbers satisfying the conditions of $0 \leq b \leq 0.5$, $0 \leq w \leq 2$, $0 \leq x \leq 0.3$ and $0 \leq y \leq 0.3$, respectively. These numbers by no means represent the contents in the resultant phosphor because the additives often decrease during the steps of firing and washing performed thereafter. Some additives remain in the resultant phosphor as they are added to the starting materials, but the others react with $M^{II}FX$ or are involved in the matrix.

In addition, the phosphor of the formula (I) may further comprise Zn and Cd compounds; metal oxides such as $TiO_2$, BeO, MgO, CaO, SrO, BaO, ZnO, $Y_2O_3$, $La_2O_3$, $In_2O_3$, $GeO_2$, $SnO_2$, $Nb_2O_5$, $Ta_2O_5$ and $ThO_2$; Zr and Sc compounds; B compounds; As and Si compounds; tetrafluoroborate compounds; hexafluoro compounds such as monovalent or divalent salts of hexa-fluorosilicic acid, hexafluorotitanic acid and hexa-fluorozirconic acid; or compounds of transition metals such as V, Cr, Mn, Fe, Co and Ni. The phosphor employable in the invention is not restricted to the above, and any phosphor that can be essentially regarded as rare earth activated alkaline earth metal fluoride halide stimulable phosphor can be used.

The stimulable phosphor represented by the formula (I) generally is in the form of particles having an aspect ratio of 0.1 to 5.0. The particles of the energy-storing phosphor in the invention have an aspect ratio of preferably 0.1 to 5.0 (more preferably 1.0 to 1.5). In their size distribution, the median diameter (Dm) preferably is in the range of 2 to 10 µm (more preferably 2 to 7 µm) and the σ/Dm (in which σ represents the standard deviation) preferably is 50% or less (more preferably 40% or less). The shape of the particle is rectangular parallelepiped, regular hexahedron, regular octahedron, tetradecahedron, intermediate polyhedron thereof, or irregular shape. Preferred is tetradecahedron.

The phosphor usable in the invention is not restricted to the above-described stimulable phosphor represented by the formula (I).

The phosphor layer can be formed, for example, in the following manner. First, the above energy-storing phosphor particles and a binder are dispersed or dissolved in an appropriate organic solvent to prepare a coating solution. The ratio between the binder and the phosphor in the solution generally is in the range of 1:1 to 1:100 (binder:phosphor, by weight), preferably 1:10 to 1:50 (by weight).

As the binder dispersing and supporting the phosphor particles, various resin materials are generally known. Examples of the binder include natural polymers such as proteins (e.g., gelatin), polysaccharides (e.g., dextran) and gum arabic; and synthetic polymers such as polyvinyl butyral, polyvinyl acetate, nitrocellulose, ethyl cellulose, vinylidene chloride-vinyl chloride copolymer, polyalkyl (meth)acrylate, vinyl chloride-vinyl acetate copolymer, polyurethane, cellulose acetate butyrate, polyvinyl alcohol, linear polyester, and thermoplastic elastomers. These may be cross-linked with a cross-linking agent.

Examples of the solvents employable in preparation of the coating solution for the phosphor layer include lower aliphatic alcohols such as methanol, ethanol, n-propanol and n-butanol; chlorinated hydrocarbons such as methylene chloride and ethylene chloride; ketones such as acetone, methyl ethyl ketone and methyl isobutyl ketone; esters of lower aliphatic alcohols with lower aliphatic acids such as methyl acetate, ethyl acetate and butyl acetate; ethers such as dioxane, ethylene glycol monoethyl ether, ethylene glycol monomethyl ether and tetrahydrofuran; and mixtures thereof.

The coating solution may contain various additives such as a dispersing aid to assist the phosphor particles in dispersing, a plasticizer for enhancing the bonding between the binder and the phosphor particles, an anti-yellowing agent for preventing the layer from undesirable coloring, a hardening agent, and a crosslinking agent.

The prepared coating solution is then evenly spread to coat a surface of the light-reflecting layer by the aforementioned coating means, and dried to form the energy-storing phosphor layer. The thickness of the phosphor layer is determined according to various conditions such as characteristics of the aimed storage panel, properties of the phosphor and the mixing ratio between the binder and the phosphor, but is generally in the range of 20 µm to 1 mm, preferably in the range of 50 to 500 µm.

The formed phosphor layer may be compressed by means of, for example, a calender. By the compression, the packing density of the energy-storing phosphor layer can be increased to 60 vol. % or more, to give a short scattering length.

The energy-storing phosphor layer may be a single layer or may consist of two or more sub-layers. The sub-layers may have different compositions. For example, they may differ in the phosphor (in regard to the compound or the particle size) or in the ratio between the phosphor and the binder. In other words, the sub-layers can be optimally designed so that the emission characteristics of the phosphor layer may suit the use of the storage panel or that a suitable scattering length may be obtained. Further, it is not necessary to form the phosphor layer directly on the light-reflecting layer. For example, the phosphor layer beforehand formed on another substrate (temporary support) may be peeled off and then fixed on the light-reflecting layer with an adhesive.

On the energy-storing phosphor layer, a protective layer is preferably provided to ensure good handling of the storage panel in transportation and to avoid deterioration. The protective layer is preferably transparent so as not to prevent the stimulating light from coming in or not to prevent the emission from coming out. Further, for protecting the storage panel from chemical deterioration and physical damage, the protective layer is preferably chemically stable, physically strong, and of high moisture proof.

The protective layer can be provided by coating the phosphor layer with a solution in which a transparent organic polymer (e.g., cellulose derivatives, polymethyl methacrylate, fluororesins soluble in organic solvents) is dissolved in an appropriate solvent, by placing a beforehand prepared sheet as the protective layer (e.g., a film of organic polymer such as polyethylene terephthalate) on the phosphor layer with an adhesive, or by depositing vapor of inorganic compounds on the phosphor layer. Various additives may be contained in the protective layer. Examples of the additives include light-scattering fine particles (e.g., particles of magnesium oxide, zinc oxide, titanium dioxide and alumina), a slipping agent (e.g., powders of perfluoroolefin resin and silicone resin) and a crosslinking agent (e.g., polyiso-cyanate). The thickness of the protective layer generally is in the range of about 0.1 to 20 µm.

For enhancing resistance to stain, a fluororesin layer may be placed on the protective layer. The fluororesin layer can be formed by coating the surface of the protective layer with a solution in which a fluororesin is dissolved (or dispersed) in an organic solvent, and by drying the applied solution. The fluororesin may be used singly, but a mixture of the fluororesin and a film-forming resin is generally employed. In the mixture, an oligomer having polysiloxane structure or perfluoro-alkyl group can be further added. In the fluororesin layer, fine particle filler may be incorporated to reduce blotches caused by interference and to improve quality of the resultant image. The thickness of the fluororesin layer generally is in the range of 0.5 to 20 μm. For forming the fluororesin layer, additives such as a cross-linking agent, a film-hardening agent and an anti-yellowing agent can be used. In particular, the crosslinking agent is advantageously employed to improve durability of the fluororesin layer.

In the way described above, a radiation image storage panel of the invention illustrated in FIG. 1 can be produced. The radiation image storage panel of the invention comprises a support 11, a light-reflecting layer 12, a phosphor layer containing an energy-storing phosphor 13, and a transparent protective layer 14.

The storage panel of the invention can be in known various structures. For example, in order to improve the sharpness of the resultant image, at least one of the sheets or layers may be colored with a colorant which does not absorb the stimulated emission but the stimulating light. Further, another phosphor layer comprising a phosphor which absorbs radiation and instantly emits ultraviolet or visible light may be provided. Examples of that phosphor include phosphors of $LnTaO_4$: (Nb, Gd) type, $Ln_2SiO_5$:Ce type and LnOX:Tm type (Ln is a rare earth element); CsX (X is a halogen); $Gd_2O_2S$:Tb; $Gd_2O_2S$:Pr, Ce; $ZnWO_4$; $LuAlO_3$: Ce; $Gd_3Ga_5O_{12}$: Cr, Ce; and $HfO_2$.

In the above description, the radiation image storage panel of the invention is explained, by way of example, in the case where the energy-storing phosphor layer is formed by coating with a coating solution containing a binder and phosphor particles dispersed therein. However, it is known that the phosphor layer containing an energy-storing phosphor can be prepared by a gas-phase accumulation method in which the energy-storing phosphor or material thereof is deposited on a substrate in a vacuum container. The radiation image storage panel of the invention may have an energy-storing phosphor layer formed by known methods like that.

EXAMPLE 1

| (1) Formation of adhesive layer and light-reflecting layer | |
|---|---|
| Resin: Saturated polyester resin [MEK solution (solid content: 30 wt. %) of VYLON 300, Toyobo Co., Ltd.] | 200 g |
| Hardening agent: polyisocyanate [Orestar NP38-70s (solid content: 70 wt. %), Mitsui Toatsu Chemicals, Inc.] | 20 g |
| Electroconductive material: $SnO_2$ (doped with Sb) needle-like particles [major axis: 0.2 to 2 μm, minor axis: 0.01 to 0.02 μm, FS-10P MEK dispersion (solid content: 30%), Ishihara Industries Co., Ltd.] | 500 g |

The above-mentioned materials were placed in 50 g of methyl ethyl ketone (MEK), and mixed and dispersed to prepare a coating solution having a viscosity of about 0.02 to 0.05 Pa·s. The coating solution was coated on a polyethylene terephthalate (PET) sheet (support, thickness: 188 μm, haze: approx. 27, Lumilar S-10, Toray Industries, Inc.), to form an adhesive layer (thickness: 4 μm, width: 490 mm), form an adhesive layer.

The following materials were then placed in 930 g of MEK, and mixed and dispersed to prepare a coating solution having a viscosity of about 2 to 3 Pa·s. The coating solution was spread on the adhesive layer, and dried to form a light-reflecting layer (thickness: approx. 100 μm, width: 490 mm).

| Light-reflecting material: Fine particles of extra-pure alumina [mean size: 0.4 μm, UA-5105, Showa Denko K. K.] | 1,000 g |
|---|---|
| Binder: Soft acryl resin [Criscoat P-1018GS (20% toluene solution), Dai-nippon Ink & Chemicals, Inc.] | 225 g |
| Surface-treatment agent: Aluminum coupling agent [Plane-act Al-M, Ajinomoto Inc.] | 5 g |
| Colorant: ultramarine [SM-1, Daiichi Chemical Industry Co., Ltd.] | 5 g |

| (2) Formation of phosphor layer | |
|---|---|
| Tetradecahedral particles of stimulable phosphor: $BaF(Br_{0.85}I_{0.15})$:$Eu^{2+}$ [mean particle size (Dm): 5 μm] | 1,000 g |
| Binder: polyurethane elastomer [MEK solution (solid content: 13 wt. %) of Pandex T5265H, Dainippon Ink & Chemicals, Inc.] | 182 g |
| Crosslinking agent: polyisocyanate resin [Colonate HX (solid content: 100%), Nippon Polyurethane Co., Ltd.] | 3 g |
| Anti-yellowing agent: epoxy resin [Epikote #1001 (solid), Yuka Shell Epoxy] | 6.7 g |

The above materials were added in 86 g of methyl ethyl ketone, and mixed and dispersed at 10,000 rpm for 30 minutes by means of a propeller mixer to prepare a coating solution having a viscosity of 3 Pa·s (binder/phosphor: 1/30, by weight). Independently, a polyethylene terephthalate (PET) sheet (temporary support, thickness: 190 μm) beforehand coated with a silicone releasing agent was prepared. The above coating solution was then spread on the releasing agent-coated surface of the temporary support, and dried to form a sheet. The sheet was then peeled from the temporary support, to obtain a phosphor sheet (thickness: 400 μm, width: 470 mm).

The phosphor sheet was placed on the light-reflecting layer so that the bottom face of the phosphor sheet (surface having been in contact with the temporary support when the sheet was prepared) would be in contact with the reflecting layer. The laminate was then pressed under heating by means of a calender roll (total weight: 2,300 kg, temperature of the upper roll: 45° C., temperature of the lower roll: 45° C., transferring rate: 0.3 m/minute), so that the phosphor sheet was completely combined with the light-reflecting layer. The thickness of the thus-formed phosphor layer was 300 μm, and the packing density of the phosphor particles contained therein was 3.40 g/cm$^3$ (65 vol. %).

| (3) Formation of protective layer | |
|---|---|
| Polymer material: fluoroolefin-vinylether copolymer [Lumiflon LF-504X (30% xylene solution), Asahi Glass Co., Ltd.] | 76 g |
| Crosslinking agent: polyisocyanate [Sumijule N3500 (solid content: 100%), Sumitomo Bayer Urethane, Inc.] | 7.5 g |
| Catalyst: dibutyl tin dilaurate [KS1260, Kyodo Yakuhin Co., Ltd.] | 0.25 mg |

The above materials were placed in 38 g of methyl ethyl ketone, and mixed and dispersed to prepare a coating solution. The coating solution was spread and dried to coat the energy-storing phosphor layer, to form a protective layer (thickness: 3 μm). Thus obtained composite product was sized for 200 mm×250 mm, to produce a radiation image storage panel of the invention comprising a support, a light-reflecting layer, a phosphor layer containing an energy-storing phosphor, and a transparent protective layer, overlaid in order.

EXAMPLE 2

The procedures of Example 1 were repeated except that 10 g of a silane coupling agent (KBE 403, available from Shin-etsu Chemical Co., Ltd) was employed as the surface-treatment agent, to produce a radiation image storage panel.

EXAMPLE 3

The procedures of Example 1 were repeated except that 10 g of a silane coupling agent (KBE 903, available from Shin-etsu Chemical Co., Ltd) was employed as the surface-treatment agent, to produce a radiation image storage panel.

COMPARISON EXAMPLE 1

The procedure of Example 1 was repeated except for not incorporating the surface-treatment agent into the coating solution for forming the light-reflecting layer, to produce a radiation image storage panel for comparison.

COMPARISON EXAMPLE 2

The procedure of Example 1 was repeated except for not incorporating the surface-treatment agent into the coating solution for forming the light-reflecting layer and viscosity of the coating solution was decreased to 1.0 to 1.5 Pa·s by using MEK in an amount of 1,100 g, to produce a radiation image storage panel for comparison.

Evaluation of Radiation Image Storage Panel

The radiation image storage panels were evaluated in the following manner.
1) Defects in Coated Layer
Immediately after the light-reflecting layer was formed, the surface of the formed light-reflecting layer was observed visually to check whether defects were present or not.
2) Variation of Thickness
Each storage panel, in which the light-reflecting layer was provided on the support via the adhesive layer, was laterally cut into three pieces. The thickness of each piece was measured at several points arrayed laterally (perpendicularly to the direction in which the coating solution was cast or spread) in the range of 470 mm with the margin of 10 cm left on each side. With respect to each piece, the difference (σ) between the thickness at the thickest point and that at the thinnest point was obtained. The σ values of the three pieces were averaged to estimate variation of thickness (μm).
3) Glossiness
The glossiness on the light-reflecting layer was measured according to JIS Z 8741 and ISO 2813 by means of a glossmeter (VG 2000, available from Japan Denshoku Co., Ltd) at an angle of 850. The higher glossiness means that the surface of the light-reflecting layer is smooth and that the light-reflecting particles on the surface are uniformly dispersed.
4) Image Quality
The radiation image storage panel was placed in a cassette and exposed to X rays (tungsten tube, tube voltage 80 kV) at 10 mR. The exposed storage panel was read in a Fuji Computed Radiography FCR 5000 (available from Fuji Photo Film Co., Ltd.) to reproduce an image on a radiographic film. The reproduced image was evaluated with respect to variation of optical density caused by structural noises. The evaluation was made according to the following criteria:
AA: Image quality is high.
CC: Variation of optical density (0.5 to 2 mm) is observed on the reproduced image.
The results are set forth in Table 1.

TABLE 1

| | Defects in coated layer | Variation of thickness | Glossiness | Image quality |
|---|---|---|---|---|
| Ex. 1 | not observed | 5 μm | 84% | AA |
| Ex. 2 | not observed | 4 μm | 86% | AA |
| Ex. 3 | not observed | 4 μm | 88% | AA |
| Com. 1 | observed (one line) | 15 μm | 79% | CC |
| Com. 2 | observed (one line) | 12 μm | 80% | CC |

The results shown in Table 1 clearly indicate that the radiation image storage panel of the invention (Examples 1 to 3), which comprises a light-reflecting layer containing a surface-treatment agent, suffers no defect in coating, has even thickness and surface smoothness, and gives a reproduced radiation image having an improved quality, as compared with the radiation image storage panel for comparison (Comparison Examples 1 and 2).

What is claimed is:

1. A radiation image storage panel which comprises a support, a light-reflecting layer, a phosphor layer containing an energy-storing phosphor, and a transparent protective layer; wherein the light-reflecting layer comprises, at least, particles of light-reflecting material having a mean size of 0.1 to 2.0 μm, a binder, and a coupling agent selected from the group consisting of an aluminum coupling agent, a titanate coupling agent and a silane coupling agent, in an amount of 0.05 to 5 wt % based on an amount of the particles of light-reflecting material, a weight ratio of the binder to the particles of light-reflecting material being in the range of 1/10 to 1/50.

2. The radiation image storage panel of claim 1, wherein the light-reflecting material is a white pigment.

3. The radiation image storage panel of claim 1, wherein the light-reflecting material is at least one white pigment selected from the group consisting of alumina, yttrium oxide, zirconium oxide and titanium oxide.

4. The radiation image storage panel of claim 1, wherein the light-reflecting layer shows a scattering length of 5 μm or less to a stimulating light which excites the energy-storing phosphor.

* * * * *